Dec. 27, 1927.

C. H. CATON 1,654,069

CHANGE SPEED DRIVING GEAR FOR MOTOR VEHICLES

Filed Sept. 19, 1925   3 Sheets-Sheet 1

INVENTOR—
C. H. CATON

Dec. 27, 1927.
C. H. CATON
1,654,069
CHANGE SPEED DRIVING GEAR FOR MOTOR VEHICLES
Filed Sept. 19, 1925    3 Sheets-Sheet 2
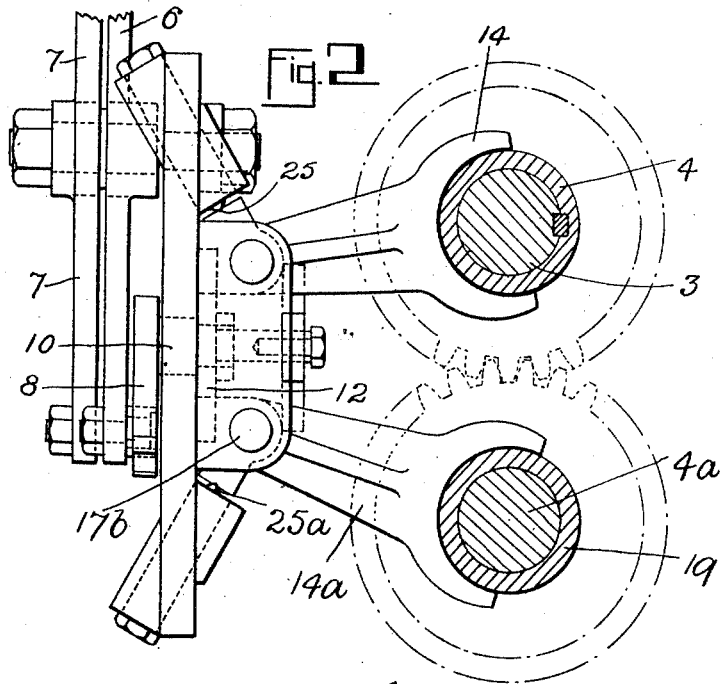
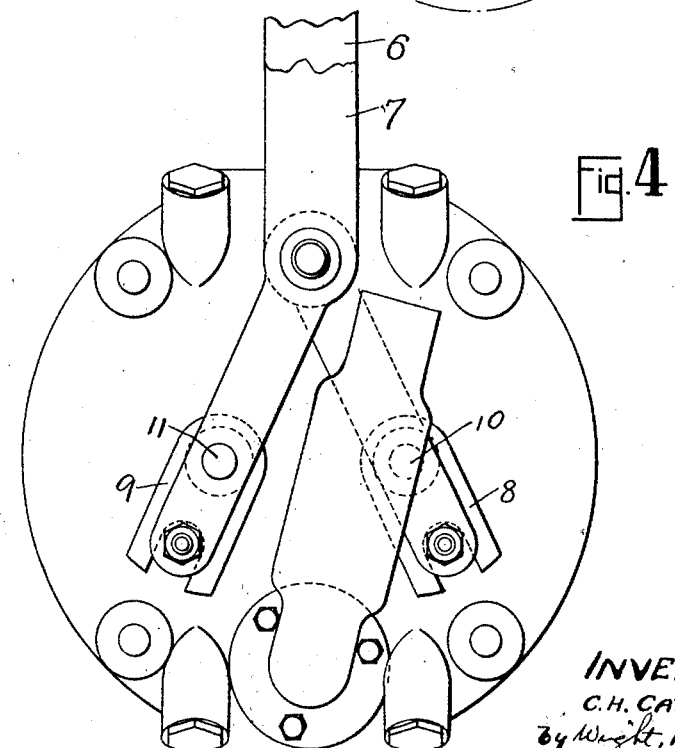
INVENTOR-
C. H. CATON Dec. 27, 1927.
C. H. CATON
1,654,069
CHANGE SPEED DRIVING GEAR FOR MOTOR VEHICLES
Filed Sept. 19, 1925   3 Sheets-Sheet 3
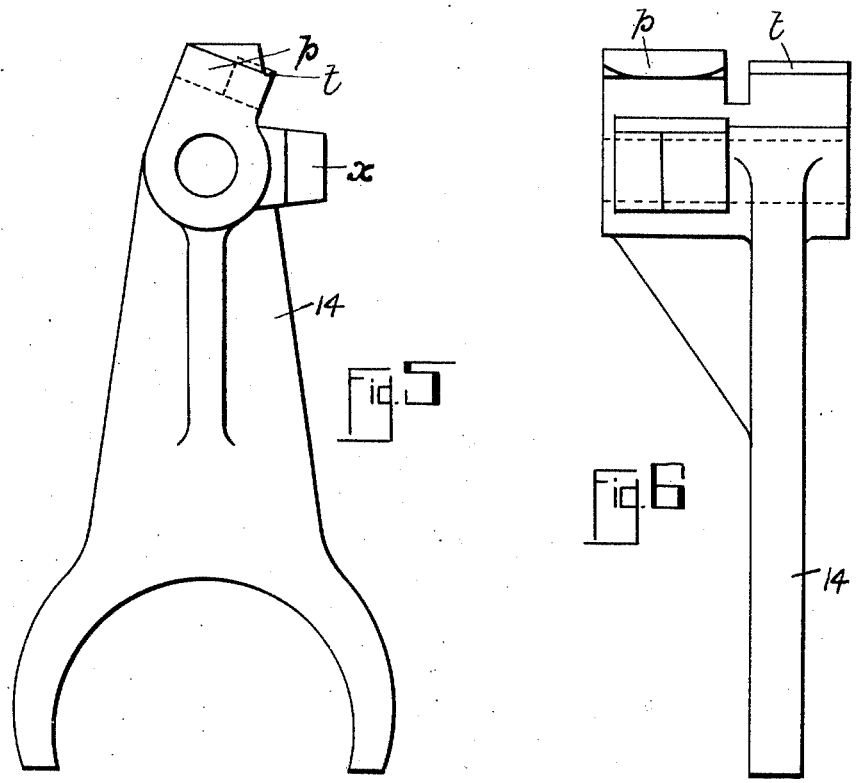
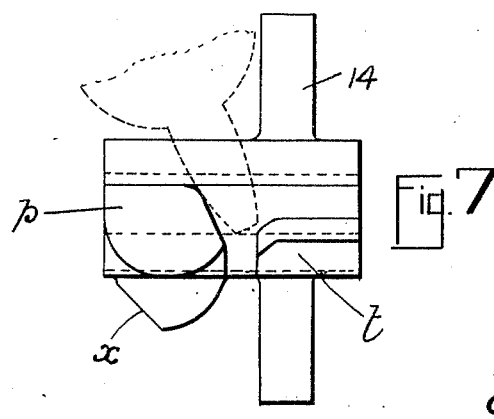
INVENTOR—
C. H. CATON
by Wright Brown
Quinby & May
Attys.

Patented Dec. 27, 1927.

1,654,069

UNITED STATES PATENT OFFICE.

CHARLES HENRY CATON, OF LEEDS, ENGLAND.

CHANGE-SPEED DRIVING GEAR FOR MOTOR VEHICLES.

Application filed September 19, 1925, Serial No. 57,369, and in Great Britain September 22, 1924.

This invention relates to the type or class of driving gear in which the main shaft of the motor has a shorter shaft in alignment with it carrying certain driving gears which mesh with other driving gears on a lay shaft parallel thereto and my said invention consists in the arrangement of the wheels and the method of engaging said wheels one with another and with their driving and driven wheels so that instead of transmitting three speeds forward and one speed in the reverse direction, I am enabled to transmit two speeds in the forward direction and two speeds in the reverse direction, while the arrangement of the gearing, the handle-lever and fork devices which I employ are of such a character as enable me to mount said gearing and the devices which operate same within the same space and the same gear case as are the well known wheels (for example those known as the Fordson gears) used for effecting three speeds forward and one speed reverse hereinbefore referred to.

In order that my said invention may be readily understood, I have hereunto appended sheets of drawings illustrative thereof, to which by letters and figures, reference is made in the following description:—

Fig. 2 is a sectional end view of certain of the parts shown by Fig. 1, as seen looking from left to right of said figure.

Fig. 4 is a view of the parts shown by Fig. 3 as seen looking from the rear of said Fig. 3.

Figs. 5, 6 and 7 are front elevation, side view and plan respectively of an operating fork constructed in accordance with my invention, the same being drawn to an enlarged scale as compared with the other figures.

Figure 1:
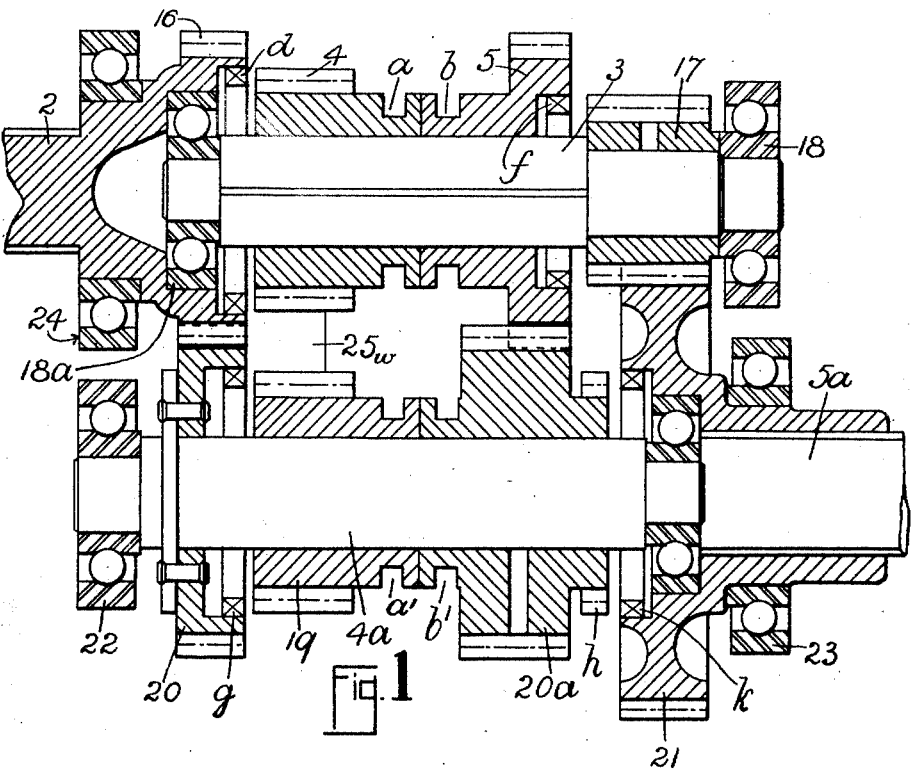
Fig. 1 is a longitudinal sectional elevation showing my arrangement of gearing upon the usual arrangement of shafts.

In carrying my invention into effect I employ the shafts 2, 3, $4^a$ and $5^a$ which are arranged as heretofore. However, on the shaft 3 which is in alignment with the main driving shaft 2 of the motor, I now spline two wheels 4 and 5 which are separately controlled by hand operated levers 6 and 7. These hand levers 6 and 7 are arranged, through the arms 8 and 9 fixed upon their respective shafts 10 and 11, to operate toothed quadrant members 12 and 13 (fixed on said shafts 10 and 11) which engage with their respective forks 14 and 15 that take into the grooves $a$ $b$ of the wheels 4 and 5. The actions of the toothed members 12 and 13 upon the sliding forks 14 and 15 will be hereinafter explained. The wheels 4 and 5 are, as stated, splined upon the shaft 3 so that by the teeth of the wheel 4 being caused to engage by its teeth with those of the dog clutch $d$ formed in the wheel 16 (which is fixed upon the shaft 2) motion is transmitted to the shaft 3 and therefore also to the wheel 5. The fork 15 which spans the groove $b$ in the wheel 5 may be operated by its handle 7 so that the dog-clutch $f$ on said wheel 5 is moved over the teeth of a wheel 17 which runs loosely upon the shaft 3.

The shaft 3 is supported in antifriction bearings 18 and $18^a$ (this latter being carried by the wheel 16) as shown by Fig. 1.

The fork 14 operated by the hand lever 6 is employed for causing the wheel 4 to engage with the dog clutch $d$ of the wheel 16 and this fork 14 is always moved at alternate times with a fork $14^a$ because these said forks are respectively operated by the teeth $w$, $w^1$ of the toothed quadrant 12.

The fork $14^a$ engages with the groove $a^1$ in the hub of a wheel 19 which runs loosely upon the shaft $4^a$ and the teeth of this wheel 19 are arranged so that when same is slid upon the shaft $4^a$ said teeth may engage with the teeth of a dog clutch $g$ in a wheel 20 which is fixed upon the shaft $4^a$. This wheel 20 meshes with the wheel 16 mounted upon the main shaft 2 so that at all times when the wheel 16 is in motion the wheel 20 revolves. On the same shaft $4^a$ is another wheel $20^a$ mounted loosely so that by the fork $15^a$ taking into the groove $b^1$ of said wheel $20^a$ the hand lever 7 may operate said wheel $20^a$ at alternate times with the operating of the wheel 5 by the fork 15 and handle 6. These alternate actions of the forks 15 and $15^a$ are effected by the toothed quadrant member 13 operating same as is hereinafter explained. On the hub of the wheel $20^a$ dog clutch teeth $h$ are formed so that same may be made to engage with dog clutch teeth $h$ formed on the wheel 21 which is fixed to the driven shaft $5^a$.

The shaft $4^a$ is mounted in antifriction bearings 22 and 23, while the hub of the wheel 16 and the end of the shaft 2 are supported by the antifriction bearings 24.

Meshing with the wheels 4 and 19 is an intermediate wheel $25^w$ which runs loosely upon a stud or supporting shaft and is used for the purpose of effecting the reverse drive as is hereinafter explained.

The several wheels and their operating forks, as shown by the drawings, are in their neutral positions so that although the main shaft 2 and the wheel 16 fixed upon it may be transmitting motion to the wheel 20 which is fixed upon the shaft $4^a$ all the other wheels are stationary.

By the user operating the hand lever 6 so as to cause the wheel 4 to engage with the wheel 16 motion will be transmitted to the shaft 3 and also to the wheel 5, but at such time it will be observed that the wheels 20, $25^w$, 19 and $20^a$ will be revolving idly. To utilize the motion of the shaft 3 when revolving as described the wheel $20^a$ may be caused to engage by the clutches $h$ and $k$ with the wheel 21, in which case motion will be transmitted to the shaft $5^a$ at the same speed as the shaft 2 since the wheels 5 and $20^a$ are of equal diameter, thus the high speed is effected.

On moving the wheel $20^a$ so that the clutches $h$ and $k$ are not in engagement, by then sliding the wheel 5 to engage with the wheel 17 motion will be transmitted through the shaft 3, the wheel 17 and the wheel 21 again to the shaft $5^a$ but at the second speed.

In this case the wheels 5, $20^a$, 19 and 20 will be running idly while the wheel 4 will be acting as a dog clutch for transmitting motion to the shaft 3 alone.

In order to effect reverse motion when driving at the high speed the teeth of the wheel 19 are made to mesh or engage with the dog clutch $g$ on the wheel 20 so that as this wheel 20 is constantly revolving with the wheel 16 the wheel 19 will at this time be made to revolve. And while thus revolving the rotary motion of the wheel 19 is transmitted through the intermediate wheel $25_w$ to the wheel 4 which is not in engagement with the wheel 16 but which will transmit the desired motion to the shaft 3. The wheel 5 will then remain in engagement with the wheel $20^a$ while this latter is coupled direct by the clutches $h$ and $k$ to the wheel 21, hence motion in the reverse direction is transmitted to the shaft $5^a$ at the higher speed.

To transmit motion in the reverse direction at the lower speed the wheel 19 will remain in gear so as to be driven by the wheel 20 and the wheel 16, while it will also transmit motion by the intermediate wheel $25_w$ to the wheel 4, this will then rotate the shaft 3 and the wheel 5 will be maintained in gear with the wheel $20^a$ which is now moved out of engagement with the wheel 21 and runs idly on its shaft 4. However, the wheel 5 will have been moved into mesh or gear with the wheel 17 so that this latter will transmit motion from the wheel 21 to the shaft $5^a$ at the lower speed.

Figure 3:
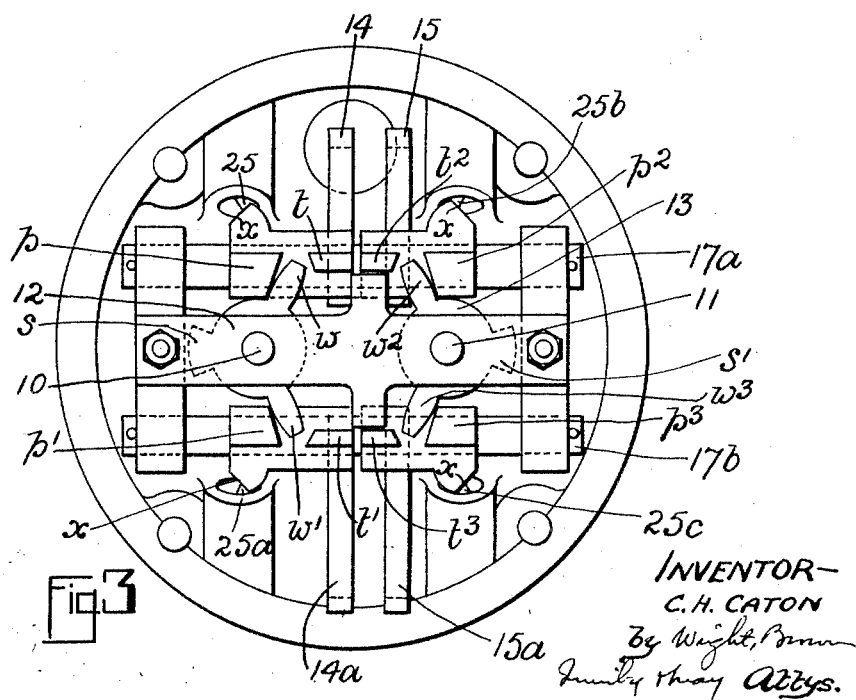
Fig. 3 is a view of the parts mounted to the rear of the gearing shown by Fig. 2.

The teeth $w$, $w^1$ and $w^2$, $w^3$ of the quadrants 12 and 13 are of the form or shape shown by Fig. 3 and are made to engage with projections $p$, $p^1$, $p^2$ and $p^3$ respectively which are formed upon the hubs of the forks 14, $14^a$, 15 and $15^a$. Thus as the said quadrants are oscillated by their shafts 10 and 11 so will the teeth move the projections $p$—$p^3$ outwardly from the central position shown. However, this movement outwardly, irrespective of any movement of the shafts 10 and 11 upon which the quadrants 12 and 13 are mounted, is limited on account of the projecting portions $s$, $s^1$ upon said quadrant coming in contact with the opposite edges of the projections $p$—$p^3$ according to the direction in which the shafts 10 and 11 are oscillated. Further than this the outer ends of the teeth $w$—$w^3$ take into the slots which exist between the projections $p$—$p^3$ and other projections $t$—$t^3$ whenever said teeth are oscillated from their central positions shown by Fig. 3 in an outward direction by reason of the outer ends of said teeth descending or entering the spaces described. This enables each tooth to return its respective fork 14—$15^a$ to its central position by reason of the teeth acting upon the projections $t$—$t^3$ until the central position is reached after which the outer end of each tooth will move clear of said projections $t$—$t^3$, leaving same in their said central positions.

In connection with the same fork levers 14—$15^a$ I use, in each case, spring actuated plungers 25, $25^a$, $25^b$ and $25^c$ which are mounted to slide within their respective boxes or casings in known manner; but the outer ends of these plungers are of wedge shape to act in conjunction with the inclined surfaces at $x$ (in each case) formed on their respective forks 14—$15^a$. Thus by the actions of said wedge shaped ends upon the inclined parts of the forks, these latter are retained in their central positions shown by Fig. 3. Whereas when the forks commence to slide over their guiding shafts $17^a$, $17^b$ from their said central positions the actions of the inclines $x$ upon their hubs cause the wedge shaped ends of the plungers 25—$25^c$ to recede within their casing at which time the hub of the fork may pass beneath same until the apex of the incline is reached on which the pressure of the spring upon the plunger forces its wedge shaped end down the curved surface adjoining the inclined surface $x$ and there causes the fork to suddenly move forward and effect the complete engagement of the part which its fork respectively operates.

By the series of driving wheels being arranged as hereinbefore described and by certain of them being enabled to be in continuous motion (although ineffectively) I am enabled to effect the gearing of one wheel with another more easily than it is possible when starting from the stationary position to the highest speed by engaging or coupling same up in the first place, since the wheels when first coupled up have the effect of merely starting certain of the other wheels into action, but without transmitting motion either backward or forward, hence when the other wheels which are for engagement with their respective clutch devices are then engaged, their respective speeds more nearly approximate those of the driving wheels so that the engagement of the clutch devices is thus more readily effected.

Such being the nature and object of my said invention, what I claim is:—

1. In change speed gearing for motor vehicles, the combination of a main driving shaft, a gear fixed to said shaft and provided with a clutch member, a second shaft in alignment with the main shaft, a gear splined upon said second shaft and having a clutch member adapted to cooperate with the clutch member of the gear on the main driving shaft, a second gear splined upon the second shaft and having a clutch member, a gear loosely mounted on the second shaft and having a clutch member adapted to cooperate with the clutch member of said second gear on the same shaft, means for sliding the gear wheels splined to the second shaft longitudinally of that shaft to effect engagement or disengagement of said clutches, a third shaft adapted to be connected to wheels of a vehicle, a transmission wheel fixed to said third shaft and engaging the loose gear on the second shaft and provided with a clutch member, a fourth shaft, a gear loosely mounted on said fourth shaft and having clutch teeth adapted to cooperate with the clutch on the said transmission wheel, a gear fast on the fourth shaft, meshing with the gear on the main shaft and provided with a clutch member, a second gear loosely mounted on the fourth shaft and having a clutch member adapted to cooperate with the clutch of the gear fast on that shaft, and means for sliding the loose gears on the fourth shaft longitudinally of that shaft to render the cooperating clutches operative or inoperative.

2. In change speed gearing for motor vehicles, the combination of a main driving shaft, a gear fixed to said shaft and provided with a clutch member, a second shaft in alignment with the main shaft, a gear splined upon said second shaft and having a clutch member adapted to cooperate with the clutch member of the gear on the main driving shaft, a second gear splined upon the second shaft and having a clutch member, a gear loosely mounted on the second shaft and having a clutch member adapted to cooperate with the clutch member of said second gear on the same shaft, means for sliding the gear wheels splined to the second shaft longitudinally of that shaft to effect engagement or disengagement of said clutches, a third shaft adapted to be connected to wheels of a vehicle, a transmission wheel fixed to said third shaft and engaging the loose gear on the second shaft and provided with a clutch member, a fourth shaft, a gear loosely mounted on said fourth shaft and having clutch teeth adapted to cooperate with the clutch on the said transmission wheel, a gear fast on the fourth shaft, meshing with the gear on the main shaft and provided with a clutch member, a second gear loosely mounted on the fourth shaft and having a clutch member adapted to cooperate with the clutch of the gear fast on that shaft, means for sliding the loose gears on the fourth shaft longitudinally of that shaft to render the cooperating clutches operative or inoperative, and a freely rotatable reverse gear meshing with the first said gear on the second shaft and the last said gear on the fourth shaft.

3. In change speed gearing for motor vehicles, the combination of a main driving shaft, a driven shaft adapted to be connected to wheels of a vehicle, said shafts being out of alignment, two intermediate shafts arranged, respectively, in alignment with the driving and driven shafts, a gear fixed on the drive shaft, a gear fixed on the driven shaft, a gear on one of the intermediate shafts in constant engagement with the gear on the driving shaft, a gear on the other intermediate shaft in constant engagement with the gear on the driven shaft, two gears splined to one of the intermediate shafts and each movable longitudinally of the shaft independently of the other, two gears loosely mounted on the other intermediate shaft and each adapted to be moved longitudinally thereof independently of the other, one of the last said gears being in constant engagement with one of the gears splined to the other intermediate shaft, means for moving said splined and loose gears longitudinally of their supporting shafts, and clutches adapted to respectively connect the gears movable longitudinally of the intermediate shafts with the fixed gears on the aligned driving and driven shafts and with the other gear on the same intermediate shaft.

4. In change speed gearing for motor vehicles, the combination of a main driving shaft, a driven shaft adapted to be connected to wheels of a vehicle, said shafts being out of alignment, two intermediate shafts arranged, respectively, in alignment with the driving and driven shafts, a gear fixed on the driving shaft, a gear fixed on the driven shaft, a gear on one of the intermediate shafts in constant engagement with the gear on the driving shaft, a gear on the other intermediate shaft in constant engagement with the gear on the driven shaft, two gears splined to one of the intermediate shafts and each movable longitudinally of the shaft independently of the other, two gears loosely mounted on the other intermediate shaft and each adapted to be moved longitudinally thereof independently of the other, one of the last said gears being in constant engagement with one of the gears splined to the other intermediate shaft, a reverse gear meshing with the other pair of loose and splined gears, means for moving said splined and loose gears longitudinally of their supporting shafts, and clutches adapted to respectively connect the gears movable longitudinally of the intermediate shafts with the gears on the aligned driving and driven shafts and with the other gear on the same intermediate shaft.

CHARLES HENRY CATON.